United States Patent [19]

Jiang et al.

[11] Patent Number: 5,623,603
[45] Date of Patent: Apr. 22, 1997

[54] METHOD OF TRANSFERRING DATA AT ADJUSTABLE LEVELS OF PRIORITIES TO PROVIDE OPTIMUM RESPONSE TO USER DEMANDS

[75] Inventors: Barclay R. Jiang, Sunnyvale; Min Zhu, Los Altos, both of Calif.

[73] Assignee: FLS Acquistion Corporation, Marina Del Rey, Calif.

[21] Appl. No.: 333,560

[22] Filed: Nov. 2, 1994

[51] Int. Cl.⁶ ............................. G06F 13/374; G06F 13/42
[52] U.S. Cl. .............................. 395/200.04; 395/200.13; 395/200.17; 395/736; 395/872
[58] Field of Search .................... 395/200.04, 200.13, 395/200.17, 250, 736, 850, 859, 872, 873, 874, 737, 860; 370/82

[56] References Cited

U.S. PATENT DOCUMENTS

| | | | |
|---|---|---|---|
| 5,058,163 | 10/1991 | Lubarsky et al. | 370/82 |
| 5,206,934 | 4/1993 | Naef, III | 395/200.04 |
| 5,214,783 | 5/1993 | Lips et al. | 395/250 |
| 5,379,374 | 1/1995 | Ishizaki et al. | 395/200.04 |
| 5,471,620 | 11/1995 | Shimizu et al. | 395/736 |

Primary Examiner—Larry D. Donaghue
Assistant Examiner—Mark H. Rinehart
Attorney, Agent, or Firm—Claude A. S. Hamrick; Emil C. Chang

[57] ABSTRACT

A method for organizing frames of data into queues for prioritized transmission is disclosed. Frames in queues can be transmitted to the other computer systems, and the priority of transfer is set according to the type of data. The frame currently being viewed is provided with a high priority. If the user changes frame before the first frame of data has been completely transmitted, the transmission of the first frame will be suspended and the second frame of data will begin transfer even though the information in the first frame has not been completely transferred. When the transmission of the second frame of data has been completed and if there are no other interruptions, the transmission of the first frame of data will resume. If the user switches back to the first frame of data before the transmission of the second frame is completed, the transmission of the second frame will be suspended and placed in a different priority queue. The first frame of data will resume transmission because it is now assigned to a higher priority.

27 Claims, 9 Drawing Sheets

METHOD OF TRANSFERRING DATA AT ADJUSTABLE LEVELS OF PRIORITIES TO PROVIDE OPTIMUM RESPONSE TO USER DEMANDS

BACKGROUND OF THE INVENTION

1. Field of the Invention

This invention relates to a method of transferring data between computer systems with specific application in teleconferencing software programs. More particularly, it involves a method for transferring large amounts of data among interconnected computer systems according to the designated priority of the data, and for allowing the priority of the data to be changed before the data is completely transferred to a remote computer and for causing the remaining data to be subsequently transferred according to its new priority.

2. Brief Description of the Prior Art

Whenever two or more people are involved in the preparation of a document, whether it be a financial spread sheet, a CAD design, a circuit schematic layout, an organization report, a bit map image, etc., succeeding drafts of the document are prepared, circulated, and modified in the process. Each person annotates his or her remarks on the document and forwards it to the next person. Typically, several drafts of the document will be circulated before a final draft is produced. This is a very time consuming process.

In the case where a person involved in the document preparation process is at a different geographical location, getting the document from one location to another location and back becomes another tedious and time-consuming task. The document will either have to be mailed or faxed to that person, further complicating the entire process.

One standard method of alleviating this process is to hold meetings where everyone gathers and comments on the document with the hope of reducing the number of drafts needed before a final draft is produced. The shortcoming of this method is that there may be significant travel time and travel cost in getting all of the people to the same location. In addition, the final draft of the document is usually again circulated for final comments.

One solution to this problem is to use a teleconferencing software program, an aspect of which may contain an embodiment of the present invention. By using computer network connections or modem connected phone lines, everyone can be connected via his or her computer. By using the teleconferencing software program, everyone's computer screen displays the same data. In addition to using the software program and network or modem connections, conference calling over the voice phone lines or through the software program creates a dynamic and live atmosphere where everyone can participate in the discussion and refer to the document displayed on the screen.

A very important capability of such teleconferencing software must be the ability to allow transfer of data from one computer user to other computer users. For example, in making a presentation using a number of frames of prepared graphs, charts, outlines, etc., each frame of data that is used must be quickly transferred to other users in the conference in order to have a common reference point for simultaneous discussion of the data presented. In addition, the presenter in the presentation may wish to skip among several frames of data or skip a few frames of data entirely. The teleconferencing software must allow this type of flexibility and still maintain a high efficiency in transferring data. At the same time, each frame of data must be organized in a manner that allows quick access by the users.

Additionally, the presenter may wish to transmit a private message to one particular user. The teleconferencing software will have to be able to distinguish between data for all interconnected computer systems (public data), and data for a particular user (private data), and properly transfer the data to the designated user or users.

Another problem in teleconferencing software is that the presenter may scroll through frames of data without allowing adequate time for the data to be transferred to all the computer systems. The presenter will eventually display one frame of data for discussion. At this time, this frame of data has the highest priority and must be immediately transferred to all other computer systems even though there may be several preceding frames of data that have not been completely transferred.

Nevertheless, all public frames of data scrolled through or loaded for the presentation must be transferred to all the connected users, because the presenter may eventually go back to previous frames of data in making his or her presentation. Thus, it is important to have the ability to organize the different frames of data and transfer the frames of data currently being used first, while establishing a system where other frames of data can be prioritized and transferred.

Figure 1:
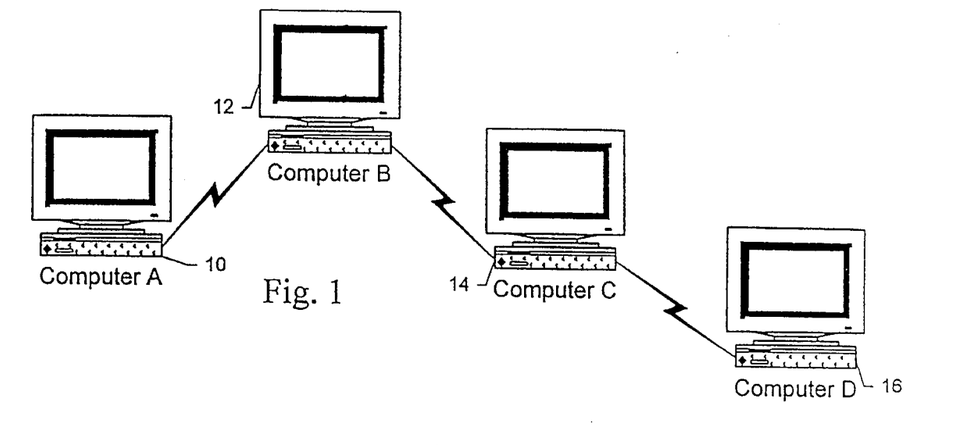
FIG. 1 is an illustration of interconnections among several computers participating in a teleconference session.

Another problem the present invention must deal with is the problem of transferring data between interconnected computer systems. The computer systems may be interconnected via modem, network, cellular links, or any other available connections. In connecting computer systems or nodes to computer systems, one computer may not be directly connected to all other computers involved in the teleconference. For example, referring to FIG. 1, there are four computer systems involved in this session of teleconferencing: computer A (10), computer B (12), computer C (14), and computer D (16). Computer A is only connected to computer B, computer B is connected to computer A and computer C, computer C is connected to computer B and computer D, and computer D is only connected to computer C. Computer A is connected to computer D only through computer B and computer C. In order for computer A to transfer data to computer D, the data must pass through computer B and computer C. Thus, if the user at computer A is making a presentation by using frames of data, these frames of data must travel through computer B and computer C to reach computer D. However, the data has to be transferred in such a manner so that there will not be a significant time lag between the time computer B receives the data, computer C receives the data, and computer D receives the data, so that all the users can follow the discussion or presentation in real-time or near real-time.

SUMMARY OF THE INVENTION

It is therefore an object of the present invention to provide a method for organizing and transferring large amounts of data and providing fast response to specific data upon user command.

It is a further object of the present invention to provide a method for prioritizing data transfer from one computer system to other computer systems.

It is another object of the present invention to allow changing of data priority before the data is completely transferred to the remote computer and later resume transferring of the data at the new priority.

It is another object of the present invention to provide a method of transferring data among interconnected computer systems such that all of the computer systems will have the same data at about the same time.

The present invention is embodied in the form of a computer program providing a method for organizing frames of data into queues where each frame of data is stored in a queue. Data in the queues can be transferred to the other computer systems, and the priority of transfer is set according to the type of data. The queue containing the frame currently being presented has a very high priority. If the user changes frame before the first frame of data has been completely transmitted, the transmission of the first frame will be paused, and transfer of the second frame of data to other computer systems will begin even though the information in the first frame has not been completely transferred. When the transmission of the second frame of data has been completed and if there are no other interruptions, transmission of the first frame of data will resume.

If the user switches back to the first frame of data before the transmission of the second frame of data is completed, the transmission of the second frame of data will be suspended and placed in a different priority queue. Transmission of the first frame of data will resume because it is now assigned the highest priority.

In a more complicated situation where there are many different sets of data, the transmission of one set of data can be suspended and have its priority readjusted. The transmission of this set of data can later resume at its new priority.

The present invention also allows for communication of private messages between computer systems. For example, if computer A wishes to send a private message to computer D, a method is provided for allowing a confidential message to be transferred to computer D without being readable at computers B and C.

Each computer system also has a transfer queue for allowing pass through of data from one computer system to other computer systems in order to allow interconnection of the computer systems.

These and other objects and advantages of the present invention will no doubt become apparent to those skilled in the art after having read the following detailed description of the preferred embodiment which is illustrated in the several figures of the drawing.

DETAILED DESCRIPTION OF THE PREFERRED EMBODIMENT

The present invention is embodied in the form of a computer software program. Although the program is developed under a windows-type system such as Microsoft Windows™ for the IBM compatible personal computers, the present invention is not limited to this platform. The present invention can be implemented in other platforms as well, for example, the Apple Macintosh™ system, Sun Microsystem™, Unix™ system, etc. However, the preferred embodiment of the present invention is implemented under the Microsoft Windows™ platform. Under a windows-type system, the input and output to communication lines and peripheral devices are managed by the windows system.

Figure 2:
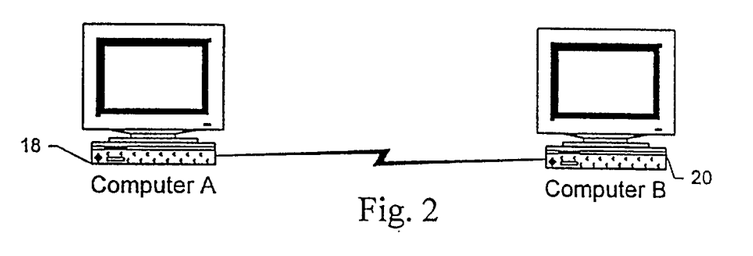
FIG. 2 is an illustration of a point-to-point communications connection where one computer system is linked to another completer system.
Figure 3:
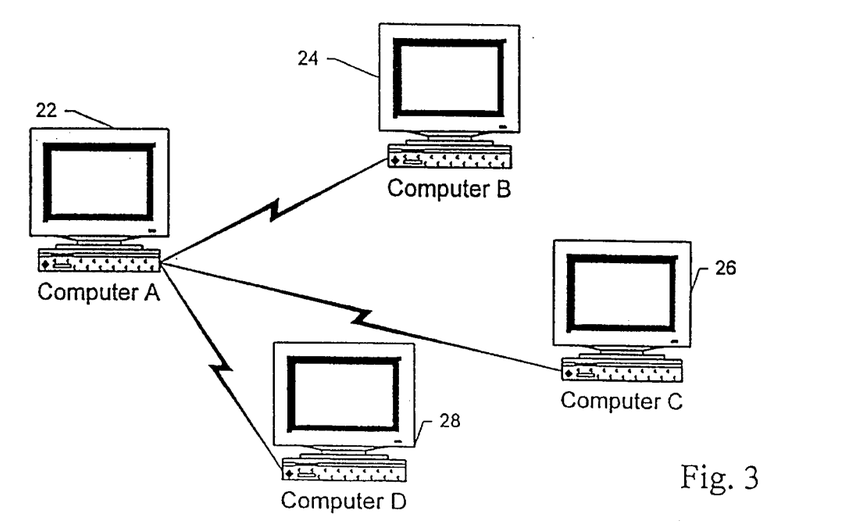
FIG. 3 As an illustration of point-to-many communications connections where one computer system is linked to many other computer systems.
Figure 4:
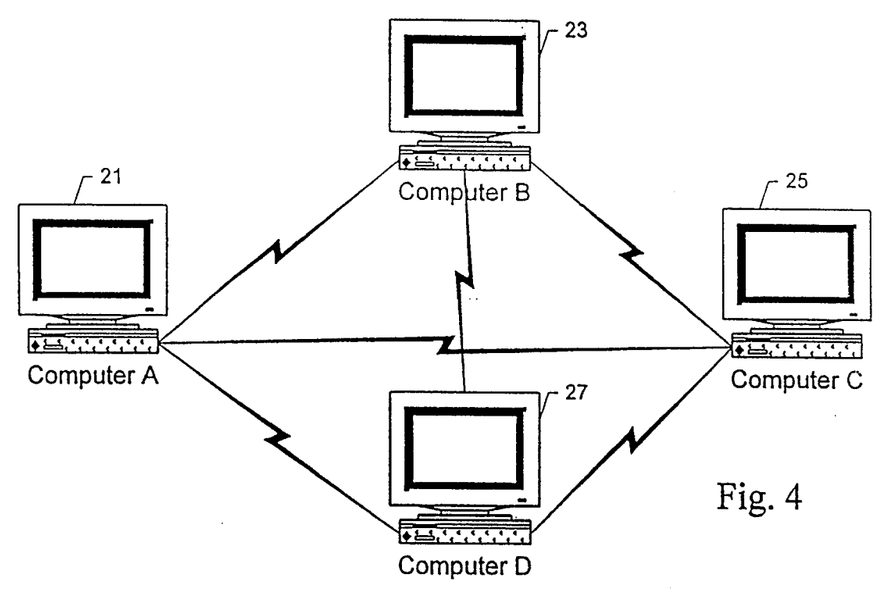
FIG. 4 is an illustration of multi-point communications connections where each computer system is linked to many other computer systems.

The present invention implements a multi-point conferencing paradigm. The connection can be either point-to-point where one computer system is connected to another computer system as illustrated in FIG. 2 where computer A (18) is connected to one other computer, computer B (20). FIG. 3 illustrates point-to-many connection configuration wherein one computer system, computer A (22), is connected to several other computer systems, i.e. computer B (24), computer C (26), and computer D (28). FIG. 4 illustrates multi-point connection scheme which is combination of the above two types of connections wherein each computer is connected to several other computers; here, computer A (21), computer B (23), computer C (25), and computer D (27) are interconnected.

Note that the communication links among the several computers may be a modem link, a network link, or other available type of communications links. The preferred embodiment supports the various communication protocols as well, such as TCP/IP, NetBios, IPX/SPX, etc. Even though the figures depict stand-alone computers, it shall be understood that the connections may be via a node to a network of computers.

A user at a computer system may be communicatively connected to one or more conferencing sessions at the same time, and each conference can be with entirely different people and computer system connections. Within each conference the user may use one or more whiteboards, and within each whiteboard there may be one or more frames of data. Thus, in addition to multi-point connections, the present invention allows multi-conferencing among different users and, within each conference, multiple whiteboards for multiple frames of data.

Figure 5:
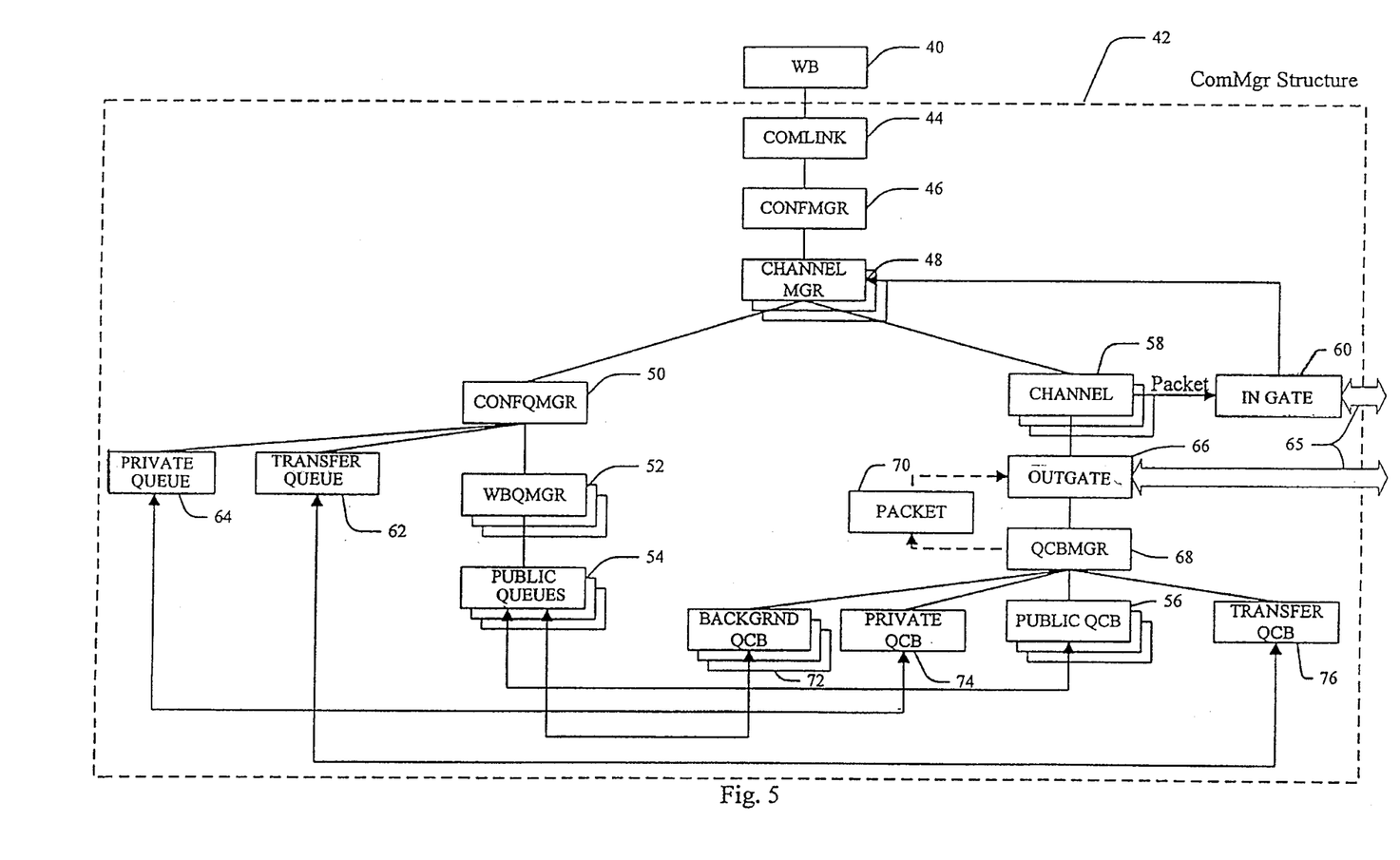
FIG. 5 is a block diagram illustrating the data structure supporting implementation of an embodiment of the present invention.

In order to manage the large amount of potentially complex data, the present invention provides a data structure to manage the information flow. FIG. 5 illustrates a conceptual structure of an embodiment of the present invention. The teleconferencing program is conceptually divided into two components: the whiteboards ("WB") 40 and the communication manager ("ComMgr") 42. There may be one or more whiteboards and the whiteboards may be for different conferences. For each whiteboard, the user may display and/or scroll through one or more frames of data or create new frames of data in the user's presentation. The frames of data that are to be transmitted to other computer systems are passed to the ComMgr structure.

A frame of data is comprised of one or more data streams. A data stream can be thought of as an object which can be a vector, a bitmap, an Object-Linking-Embedding (OLE)

object, a message, a document, a line, a metafile, etc. By organizing data into objects (or data streams), the objects can be better managed and efficiently transferred. A frame of data can be prepared by using any other types of programs, or it can be created on the whiteboard of the teleconferencing program.

A frame of data is transferred to the ComMgr on a stream-by-stream basis. When a stream of data is passed to the ComMgr, it first passes through the Communication Link module ("ComLink") 44. The ComLink module provides the necessary windows system interface to receive and process the data stream. The processed data stream then passes to the conference manager ("ConfMgr") 46. The ConfMgr establishes conferences upon user command, organizes the established conference or conferences, and routes the data stream to the appropriate channel manager ("ChannelMgr") 48. For each conference there is a ChannelMgr and each ChannelMgr manages a group of connections or channels associated with a particular conference in data transmission. After the data stream is processed by the ChannelMgr, the data stream is passed to the conference queue manager ("ConfQMgr") 50. The ConfQMgr establishes and manages the multiple whiteboards that may be opened by the user, and also manages the transfer queue 62 and the private queue 64. For every whiteboard opened there is an associated Whiteboard Queue Manager ("WBQMgr") 52. If the data stream is from a new frame of data, the WBQMgr will set up a new queue to store this frame and set up the related housekeeping data for this queue. The housekeeping data include setting up QCB in the QCB Manager for each channel.

The WBQMgr identifies the frame origin of the data stream and places it in a corresponding public queue 54. For each public queue, there is a corresponding public queue control block ("public QCB") 56. As explained below, the management of the transmission of the data in the queues is accomplished via the queue control blocks.

A queue control block ("QCB") contains information regarding the location of the queue, the location of the next data to be transferred within the queue, and other housekeeping types of information regarding the queue.

The ChannelMgr 48 also manages, at the application level, the channels 58 used in the transmission of data. There is a channel for every communication connection for the conference. When a channel receives a packet of data via an InGate module 60 which is connected to a communication link 65, that packet of data is forwarded to the ChannelMgr 48. The ChannelMgr routes the packet to the appropriate ConfQMgr 50 and into the transfer queue 62 or private queue 64 for further transmission to other connected computer system or systems or processing by the host system. Also, the packet is reformatted into a data stream and stored on the host computer for reference. If a packet does not need to be forwarded to other computers, it is then discarded. When a channel 58 has permission to transmit data, the channel activates the OutGate module 66 which is connected to a communication link 65.

A QCB Manager 68 is setup for each channel and each QCB Manager manages a set of QCBs associated with the conference. Furthermore, the QCB Manager manages and organizes the QCBs and queues for data transmission according to priority. More specifically, the QCB Manager manages the Current_QCB_ptr for the channel, retrieves a packet from the queue whose QCB is being pointed to by the Current_QCB_Ptr, and sets the Current_QCB_Ptr if the Current_QCB_Ptr is pointing to an empty queue.

The OutGate 66 will request, from the QCBMgr 68, a packet of data 70 for transmission. In response, the QCBMgr polls the Private Queue Control Block ("Private QCB") 74, the public QCB list 56, the background QCB list 72, and the Transfer Queue 76 in a specific order of priority for a data packet. If a packet is obtained, the packet is routed to the OutGate for transmission. Note that a packet of data is different from a data stream in that the size of a data packet is optimized for data transmission through the communication connections, and a packet has its own set of necessary header and housekeeping information.

Figure 6:
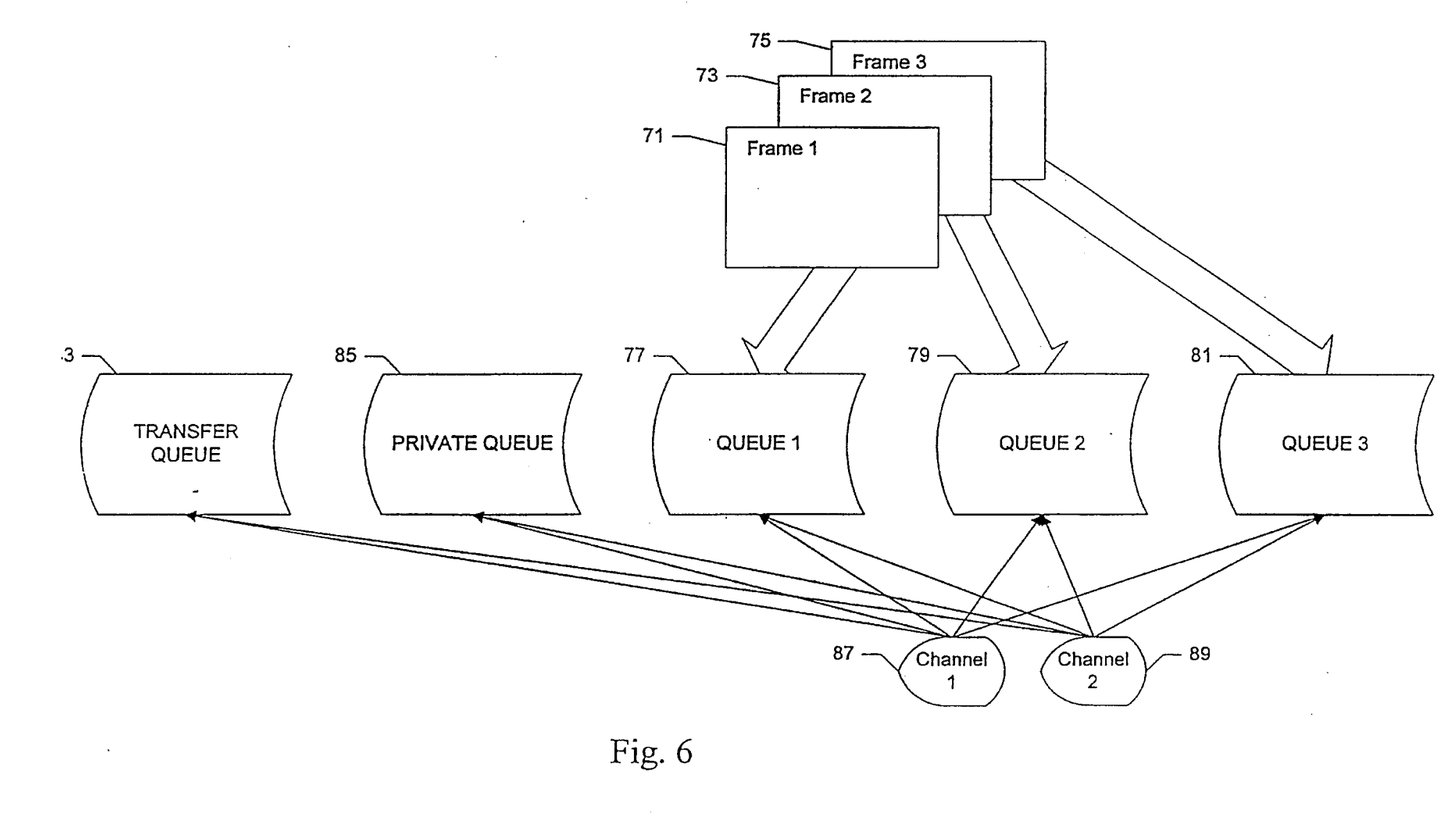
FIG. 6 is an illustration of an interaction of channels and queues in a teleconference session.

FIG. 6 illustrates the interaction of the channels with the queues in a conference. As an example, there are three frames of data 71, 73, and 75, and each frame of data is respectively deposited into one of the queues 77, 79, and 81. There is also a transfer queue 83 and a private message queue 85 into which the frames may be transferred. The connection to these queues are not shown. This conference is connected to two other computer systems or nodes as illustrated by the two channels 87, 89. Each channel has access to the queues via its own QCB Manager and Current_QCB_Ptr. With each QCB Manager managing all the QCBs, each channel can access all the queues and transmit data at its own speed without regard to the transmission speed of other channels.

Figure 7:
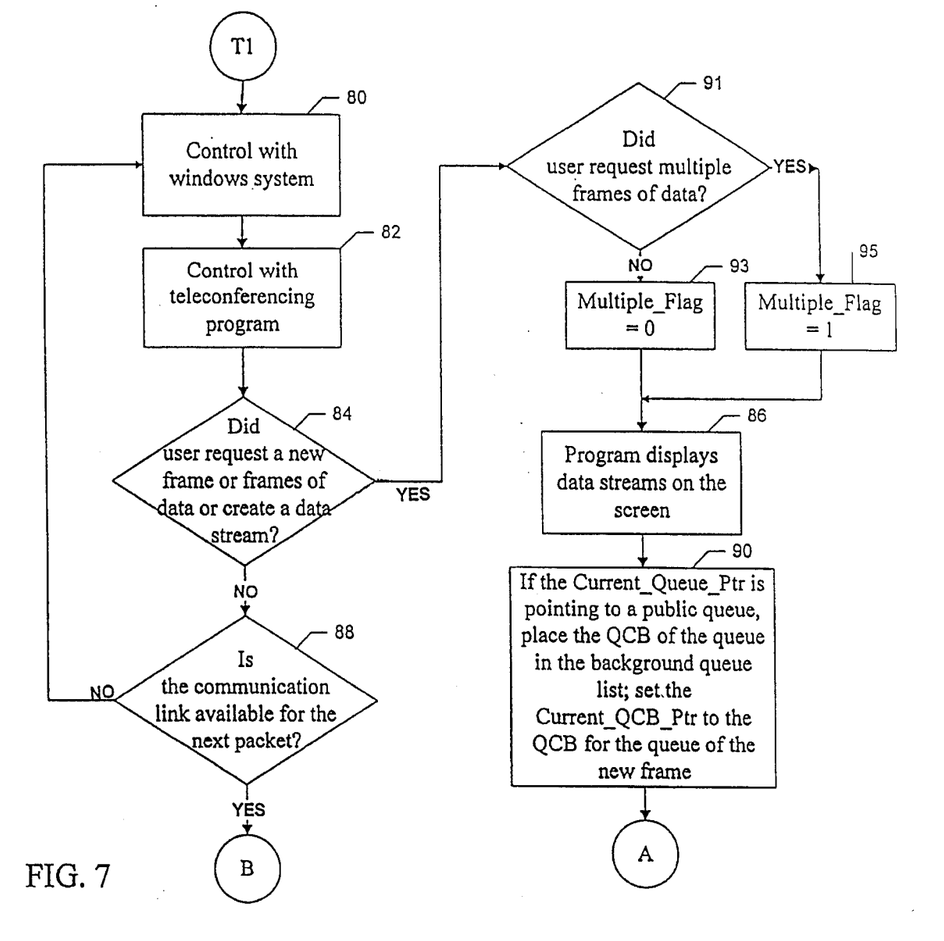
FIGS. 7–11 depict a flowchart illustrating the method steps of the preferred embodiment of the present invention.

Referring now to the flowchart of FIG. 7, before the program is initiated, the control resides with the windows system (80). After the user initiates the teleconferencing program, control transfers to the teleconferencing program as indicated at 82. Once the teleconferencing program is initiated, the user may direct the computer to establish connections to other computer systems. When these connections are established, the user may load a previously prepared frame of data or create data streams for a new frame. If the user requests a new frame of data or creates a data stream for a new frame (84), the program first checks to see if the user is requesting multiple frames of data (91). If the user is requesting multiple frames of data, the Current_QCB_Ptr will point to the first frame of data, and the first frame of data is placed into a queue. The other frames of data will be loaded into queues as well, and their QCBs will be placed into the public QCB list for later transmission. If there are multiple frames of data, a flag, Multipl_Flag is set to "1" 95; otherwise, it is set to "0" 93. The program will display the first frame of data on this user's computer screen (86).

At this time, if the QCB being pointed to by the current QCB pointer ("Current_QCB_Ptr") is a public QCB, it is placed in a background QCB list for later transmission as indicated at 90. The Current_QCB_Ptr is redirected to point to the QCB that points to a queue created to store this new frame of data. Note that the Current_QCB_Ptr is a pointer set to point to the QCB that points to a queue whose data is to be transmitted next by its corresponding channel.

Figure 8:
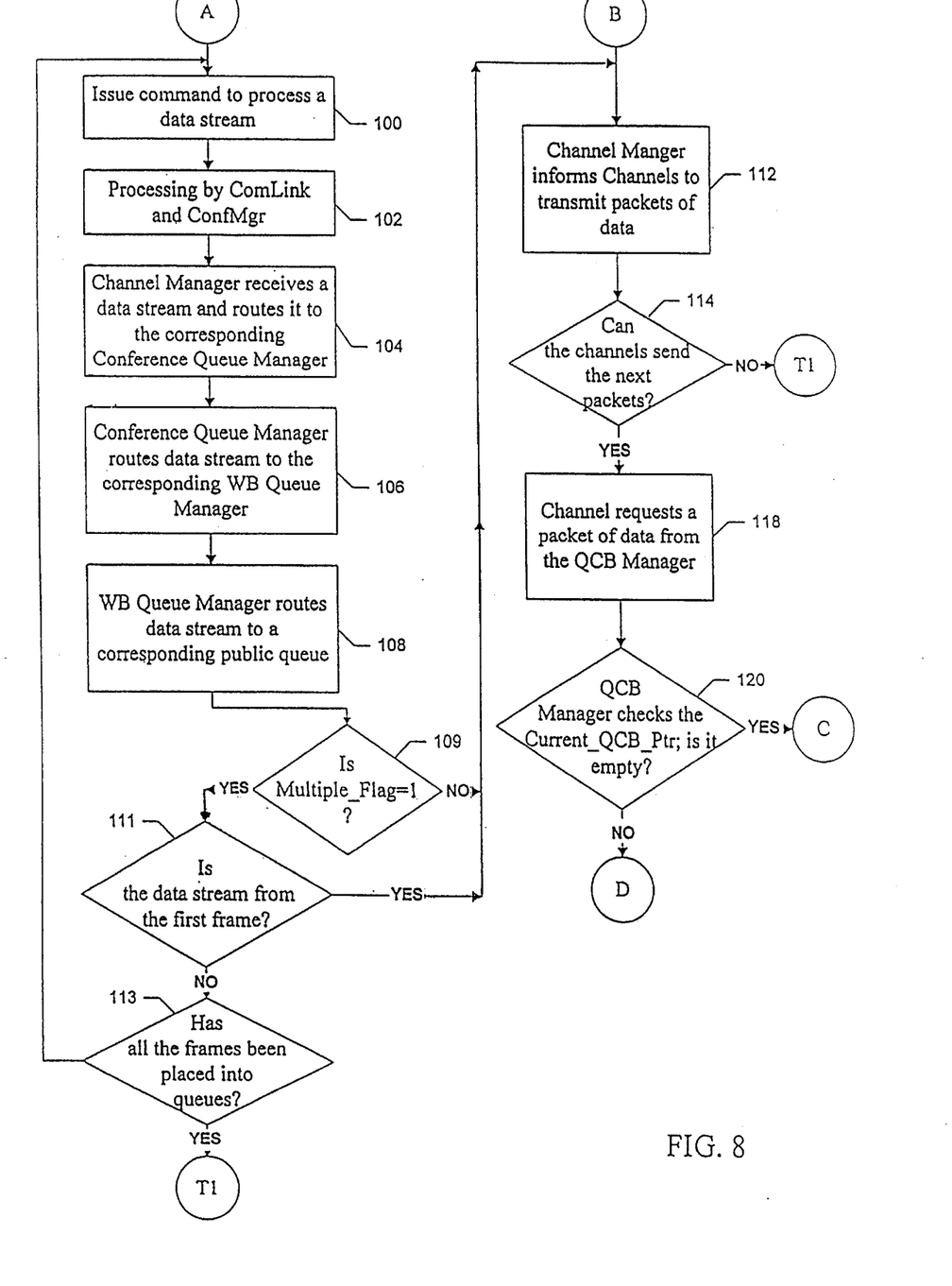

Referring to FIG. 8, a command is issued to obtain a data stream from this frame and transmit the data stream, if appropriate, to other computer systems as indicated at 100. This data stream passes through the ComLink module and is processed by the ConfMgr module as indicated at 102. The ConfMgr manages multiple conferences (if multiple conferences are established) and adds appropriate header information to the data stream to properly identify its source conference. (Source conference is the conference where the data stream originated.)

There is a ChannelMgr associated with each conference, and the data stream is routed to the ChannelMgr associated with the source conference (104). The ChannelMgr also manages the channel or channels associated with the conference. Since the host computer may be connected to several other computers, there may be several conference connections, and there is a channel managing each conference connection. The data stream is processed by the ChannelMgr and routed to the ConfQMgr (104). Since there may be several whiteboards within a conference and there is a WBQMgr for each whiteboard, the ConfQMgr establishes and manages the WBQMgrs and passes the data stream to the corresponding WBQMgr (106). Note that if a queue has not been set up to store this frame of data, a queue will be set up by the WBQMgr. The WBQMgr manages the public queue used to store this frame of data, and the data stream is deposited into the queue (108). If the current frame of data is a public frame of data for all connected users, the data will be placed in a public queue. If it is a private queue, it is placed into a private queue. The WBQMgr also manages other public queues containing data frames associated with this whiteboard.

If the user requested multiple frames of data to be loaded as indicated at 109 (Multiple_Flag_ =1) and the data stream is from the first frame of data (111), the program will attempt to transmit a packet of data through the channels by branching to B. If the user requested multiple frames of data to be loaded (109) and the data stream is not from the first frame (111), the program will continue to load frames into queues. The program checks to see if all the frames are loaded into queues or not (113). If all the frames have not been loaded, the program branches to A; otherwise the control returns to the windows system via T1. Note that the subsequent frames of data will have their QCBs placed into the public QCB list for later transmission. If the user did not request multiple frames of data, there is only one frame of data, and the program will attempt to transmit a packet of data.

Further, note that alternate program flows are possible to check for availability of communication link and transmit data packets after loading each frame or after loading a given number of data streams.

Continuing from B, once the data stream is stored in the queue, control goes back to the ChannelMgr. The ChannelMgr at this time instructs each channel to transmit a packet of data as indicated at 112. A channel first checks to see if the underlying system (the windows system) grants permission to send a packet of data (114). Permission is granted when the system determines that the communication link associated with that channel is available for transmission of data. If no permission is granted, control will return to the windows system (116) (via T1) to monitor and execute other tasks. The windows system will transfer control to the teleconferencing program from time to time. The communication link will eventually become available, and packets of data will eventually be transmitted. If a channel has permission to transmit a packet of data, the channel will request a packet of data from the QCB Manager as set forth at 118.

Figure 9:
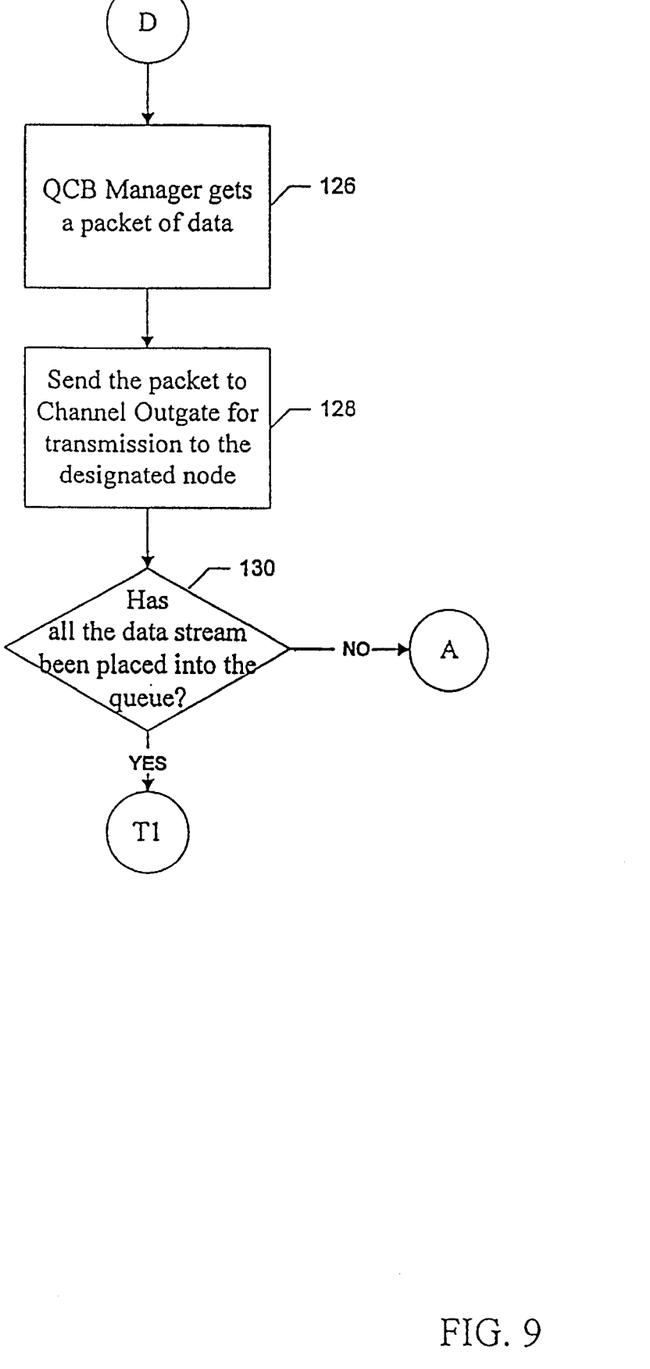

The QCB Manager checks the Current_QCB_Ptr (120) to see if a packet is available from the queue whose QCB is being pointed to by the Current_QCB_Ptr. If a packet is available (as indicated by a No), referring to FIG. 9, the QCB manager gets a packet of data from the queue being pointed to by the Current_QCB_Ptr 126, and the QCB manager passes this packet of data to the channel OutGate module (128). The channel OutGate Module performs all the necessary functions to carry out the transmission of the packet to the designated node or computer system. At this point, if all the data streams from the frame (the entire frame) have been placed in the queue, although not necessarily transmitted to other nodes, the control returns to the windows system (as indicated at T1 of FIG. 9 and FIG. 7). If not all the data streams have been placed in the queue, the control flows via A of FIG. 9 to A of FIG. 8 to continue placing the data streams of the frame into its queue.

If all the data streams in the frame have been placed in the queue, the control flow will return to windows. The windows system in turn will conduct maintenance work and allocation of resources, etc. After a short period of time, the control will return from the windows system to the teleconferencing program. At this time, if the user requests a new frame or frames of data or creates a new frame of data by creating data streams, the cycle repeats. Otherwise, the program checks the communication link to see if it is available for transmission of the next packet (88 in FIG. 7). If the communication link is available, the control flows from via B of FIG. 7 to B of FIG. 8. If the communication link is not available for the next packet, the control returns to windows again.

Figure 10:
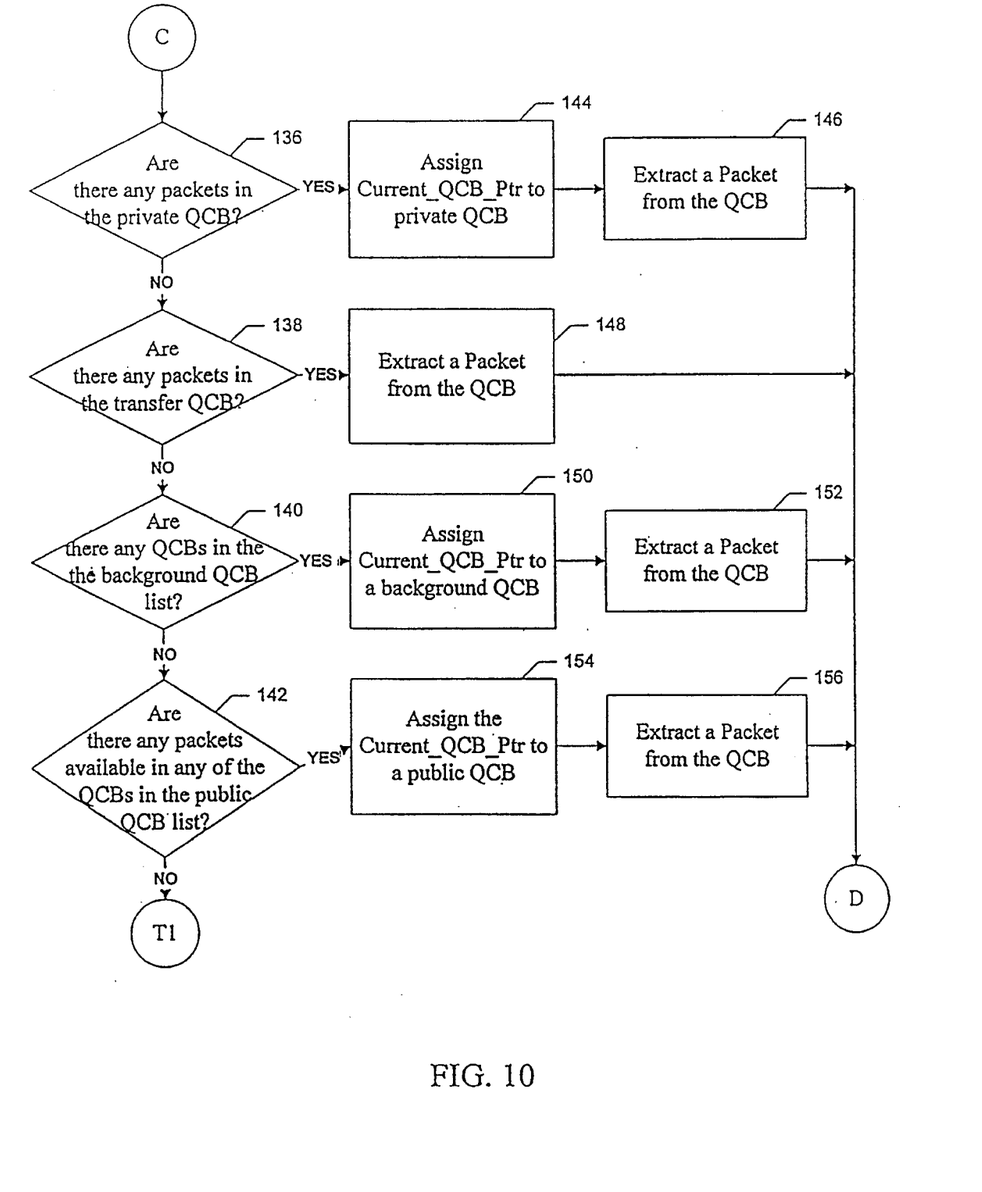

Referring back to FIG. 8, if the queue being pointed to by the Current_QCB_Ptr is empty, the control flows via C of FIG. 8 to C of FIG. 10. Here, the program will find a packet of data, if one is available, according to the data type and its assigned priority. First, private messages are the most urgent messages between users, and thus have the highest priority. Private messages usually are grouped into a single data stream and transmitted as a single packet. If there is a private message, as illustrated at 144, the Current_QCB_Ptr is assigned to the private QCB and a packet is extracted from the private QCB (146). The extracted packet is passed to via D back to FIG. 9 and processed as described above.

If there are no packets in the private QCB, the transfer QCB is checked as indicated at 138. If a packet is available from the transfer QCB, it is extracted and processed at 148. Note that the Current_QCB_Ptr is not assigned to the transfer QCB because the transfer QCB is the default queue for data transmission if there are no private messages. If there are no packets in the transfer QCB, the background QCB list is checked (140). The background QCB list contains a list of public QCB where the data transmission of these queues has been interrupted by the introduction of another frame. If there are QCBs in this list, the Current_ QCB_Ptr is set to point to the first QCB from this list (150), and a packet is extracted from the queue pointed to by the QCB (152). If there are no QCBs in the background QCB list, the public QCB list is checked (142). If there is a public QCB available for the purpose of data transmission from the public QCB list, the Current_QCB_Ptr is set to it (154) and a packet of data is extracted (156). If there are no public QCBs, the control flows back to windows via T1. Note that the difference between the background QCB list and the public QCB list is that the background QCB list contains QCBs pointing to public queues that have already started transmitting data from their respective queues before the transmission was interrupted, while the public QCB list contains QCBs pointing to public queues that have not been transmitted at all. In this manner, the two situations are grouped into two different QCB lists and given different transmission priority.

Figure 11:
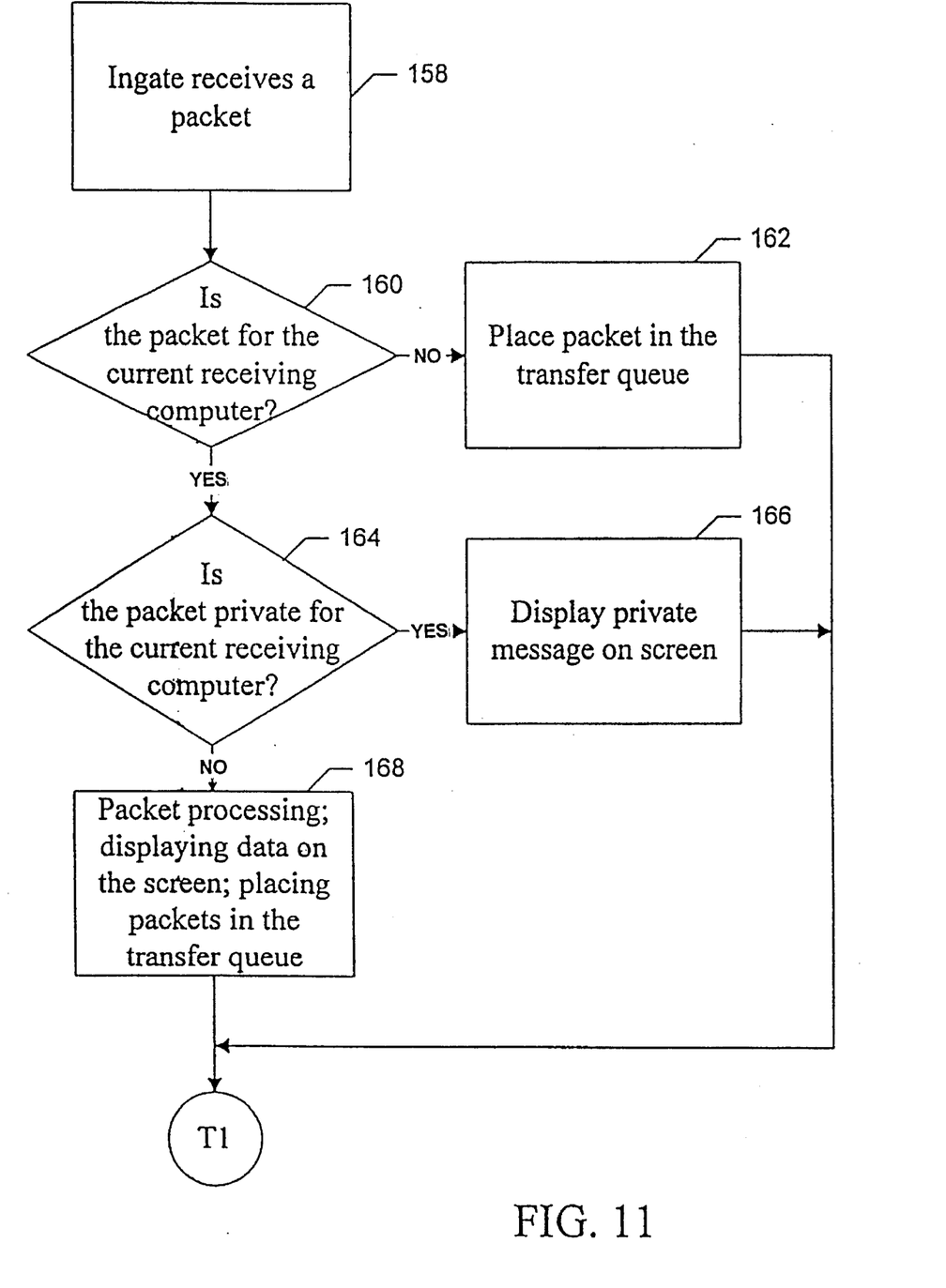

Beside transmitting frames of data to other computers as described above, the host computer can also receive data from other computers. Referring to FIG. 11, when the InGate module of a channel receives a packet of data as indicated at 158, the destination of the packet is checked (160). If this packet is not for the host computer (i.e. a private message for another user in the conference), it is placed in the private message queue (162), and control is returned to windows via T1. Otherwise, the packet is for the host computer. If the packet is a private message for the current computer as determined at 164, the private message is displayed on the screen (166), and the control is returned to windows system. If the packet is for all of the users in the conference, the packet is processed, stored, and displayed, if appropriate (168). The packet is placed in the transfer queue as well, if the host computer is routing data to other computers or nodes (168).

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of transmitting a plurality of frames of data from a host computer to a plurality of remote computers via a plurality of communication links, said plurality of frames of data being stored in queues, each of the queues having a queue control block associated with each of the communication links, the plurality of queue control blocks associated with each communication link being placed in a public QCB list corresponding to the particular communication link, wherein the queue control block contains at least a pointer to the queue and a pointer to the next data position for transmission by the communication link, and wherein each of the communication links has an associated current-queue-pointer, comprising the steps of:

a) setting the current-queue-pointer to point to a queue control block in the public QCB list of the particular communication link, the queue being pointed to by said queue control block containing a frame of data;

b) setting the current-queue-pointer to point to a queue control block from the background QCB list of the particular communication link and removing said queue control block now pointed to by the current-queue-pointer from the background QCB list, if the particular communication link is available for transmission of data, if the queue being pointed to by the current-queue-pointer is empty, and if the background QCB list for the particular communication link is not empty;

c) setting the current-queue-pointer to point to a queue control block from the public QCB list and removing said queue control block now pointed to by the current-queue-pointer from the public QCB list, if the particular communication link is available for transmission of data, if the queue being pointed to by the current-queue-pointer is empty, and if the public QCB list is not empty;

d) extracting a data packet from the queue being pointed to by the queue control block being pointed to by the current-queue-pointer and transmitting said data packet to the remote computer connected via the particular communication link, if the particular communication link is available for transmission of data, and if the queue being pointed to by the current-queue-pointer is not empty;

e) if the user requests a specific frame of data, placing the queue control block being pointed to by said current-queue-pointer at a first location within a particular QCB list and setting the current-queue-pointer to point to the queue control block pointing to the queue storing said specific frame of data;

f) if the user creates a new frame of data, placing the new frame of data into a queue, establishing a queue-control block for the queue of the new frame of data, placing the queue control block being pointed to by said current-queue-pointer at a first location within a particular list of QCBs, and setting the current-queue-pointer to the queue control block pointing to the queue storing the new frame of data; and g) repeating steps b, c, d, e, and f for each communication link until all data in said queues have been transmitted to said plurality of remote computers via said plurality of communication links.

2. A method as recited in claim 1 wherein said first location is the background QCBs list.

3. A method as recited in claim 1 wherein said host computer provides a transfer queue providing a storage space for use in transferring said frames of data between the plurality of remote computers via the plurality of communication links, said transfer queue having a transfer queue control block, said method further including the following step after step (b):

if the queue being pointed to by the current-queue-pointer is empty, and if the transfer queue is not empty, extracting a data packet from the transfer queue and transmitting the extracted data packet to the remote computer connected via the particular communication link.

4. A method as recited in claim 3 wherein a private message may be transmitted by said host computer to a remote computer by placing the private message in a private message queue in said host computer and in each of said plurality of remote computers, and wherein the private message queue has a private message queue control block, said method further including the following step before step (b):

if the queue being pointed to by the current-queue-pointer is empty, and if the private message queue is not empty, setting the current-queue pointer to the private message queue control block.

5. A method as recited in claim 4 wherein the host computer receives a packet of data from a remote computer and further including between step f) and step g) the steps of:

displaying the private message on a screen for the host computer, if the received packet is designated for the host computer and if the received packet is a private message for the host computer;

copying the received packet to a storage location whereby the received packet of data can be accessed and manipulated by the host computer and placed in the transfer queue, if the received packet is designated for the host computer and if the received packet is not a private message for the host computer; and if the received packet is not designated for the host computer, placing the received packet in the transfer queue.

6. A method as recited in claim 5 wherein each communication link is managed by a channel manager that manages and directs data in the queues through the use of the queue control blocks, said method further including the step of updating the queue control blocks after extraction of data packets.

7. A method as recited in claim 1 wherein a private message may be transmitted by said host computer to a remote computer by placing the private message in a private message queue, and wherein the private message queue has a private message queue control block, said method further including the following step before step (b):

if the queue being pointed to by the current-queue-pointer is empty and if the private message queue is not empty, setting the current-queue-pointer to the private message queue control block.

8. A method as recited in claim 1 wherein each communication link is managed by a channel manager that manages and directs data in the queues through the use of the queue control blocks, said method further including the step of updating the queue control blocks after extraction of data packets.

9. A method as recited in claim 1 wherein the host computer receives a packet of data from a remote computer and further including between step f) and step g) the steps of:

displaying the private message on a screen for the host computer, if the received packet is designated for the host computer and if the received packet is a private message for the host computer;

copying the received packet to a storage location whereby the received packet of data can be accessed and manipulated by the host computer and placed in the transfer queue, if the received packet is designated for the host computer and if the received packet is not a private message for the host computer; and if the received packet is not designated for the host computer, placing the received packet in the transfer queue.

10. A method for use in a teleconferencing system providing an environment in a host computer whereby multiple computers at different sites can be electronically and communicatively linked to pass data among said multiple computers, the system including means for establishing a plurality of communication links between the host computer and a plurality of remote computers, user-interface means responsive to user commands for loading previously created frames of data for transmission to a remote computer and for allowing user creation of new frames of data, means for transmitting said frames of data from the host computer to at least one of the plurality of remote computers via the plurality of communication links, and control means for controlling said transmitting means, the control means storing said plurality of frames of data in queues, each of the queues having a queue control block associated with each of the communication links, the plurality of queue control blocks associated with each communication link being placed in a public QCB list corresponding to the particular communication link, and wherein each queue control block contains at least a pointer to the queue and a pointer to the next data position for transmission, and wherein each of the communication links has an associated current-queue-pointer, wherein for each of the communication links the control means implements the steps of:

a) setting the current-queue-pointer to point to a queue control block in the public QCB list of the particular communication link, the queue being pointed to by said queue control block containing a frame of data;

b) setting the current-queue-pointer to point to a queue control block from the background QCB list for the particular communication link and removing said queue control block now pointed to by the current-queue-pointer from the background QCB list, if the particular communication link is available for transmission of data, if the queue being pointed to by the current-queue-pointer is empty, and if the background QCB list of the particular communication link is not empty;

c) setting the current-queue-pointer to point to a queue control block from the public QCB list and removing said queue control block now pointed to by the current-queue-pointer from the public QCB list, if the particular communication link is available for transmission of data, if the queue being pointed to by the current-queue-pointer is empty, and if the public QCB list is not empty;

d) extracting a data packet from the queue being pointed to by the queue control block being pointed to by the current-queue-pointer and transmitting said data packet to the remote computer connected via the particular communication link, if the particular communication link is available for transmission of data, and if the queue being pointed to by the current-queue-pointer is not empty;

e) if the user requests a specific frame of data, placing the queue control block being pointed to by said current-queue-pointer at a first location within a particular QCB list and setting the current-queue-pointer to point to the queue control block pointing to the queue storing said specific frame of data;

f) if the user creates a new frame of data, placing the new frame of data into a queue, establishing a queue-control block of the queue for the new frame of data, placing the queue control block being pointed to by said current-queue-pointer at a first location within a particular list of QCBs, and setting the current-queue-pointer to the queue control block pointing to the queue storing the new frame of data; and g) repeating steps b, c, d, e, and f for each communication link until all data in said queues have been transmitted to said plurality of remote computers via said plurality of communication links.

11. A method for use in a teleconferencing system as recited in claim 10 wherein said first location is the background QCBs list.

12. A method for use in a teleconferencing system as recited in claim 10 wherein said host computer provides a transfer queue providing a storage space for use in transferring said frames of data between the plurality of remote computers via the plurality of communication links, said transfer queue having a transfer queue control block, and wherein, after step (b):

if the queue being pointed to by the current-queue-pointer is empty, and if the transfer queue is not empty, extracting a data packet from the transfer queue and transmitting the extracted data packet to the remote computer connected via the particular communication link.

13. A method for use in a teleconferencing system as recited in claim 12 wherein a private message may be transmitted by said host computer to a remote computer by placing the private message in a private message queue in said host computer and in each of said plurality of remote computers, and wherein the private message queue has a private message queue control block, said method further including the following step before step (b):

if the queue being pointed to by the current-queue-pointer is empty, and if the private message queue is not empty, setting the current-queue pointer to the private message queue control block.

14. A method for use in a teleconferencing system as recited in claim 13 wherein the host computer receives a packet of data from a remote computer, and further including between step f) and step g) the steps of:

displaying the private message on a screen for the host computer, if the received packet is designated for the host computer and if the received packet is a private message for the host computer;

copying the received packet to a storage location whereby the received packet of data can be accessed and manipulated by the host computer and placed in the transfer queue, if the received packet is designated for the host computer and if the received packet is not a private message for the host computer; and if the received packet is not designated for the host computer, placing the received packet in the transfer queue.

15. A method for use in a teleconferencing system as recited in claim 14 wherein each communication link is managed by a channel manager that manages and directs data in the queues through the use of the queue control blocks, said method further including the step of updating the queue control blocks after extraction of a data packet.

16. A method for use in a teleconferencing system as recited in claim 10 wherein a private message may be transmitted by said host computer to a remote computer by placing the private message in a private message queue in said host computer and in each of said plurality of remote computers, and wherein the private message queue has a private message queue control block, said method further including the following step before step (b):

if the queue being pointed to by the current-queue pointer is empty, and if the private message queue is not empty, setting the current-queue pointer to the private message queue control block.

17. A method for use in a teleconferencing system as recited in claim 10 wherein each communication link is managed by a channel manager that manages and directs data in the queues through the use of the queue control blocks, said method further including the step of updating the queue control blocks after extraction of data packets.

18. A method for use in a teleconferencing system as recited in claim 10 wherein the host computer receives a packet of data from a remote computer, and further including between step f) and step g) the steps of:

displaying the private message on a screen for the host computer, if the received packet is designated for the host computer and if the received packet is a private message for the host computer;

copying the received packet to a storage location whereby the received packet of data can be accessed and manipulated by the host computer and placed in the transfer queue, if the received packet is designated for the host computer and if the received packet is not a private message for the host computer; and if the received packet is not designated for the host computer, placing the received packet in the transfer queue.

19. A computer system including and executing one or more programs for transmitting a plurality of frames of data from a host computer to a plurality of remote computers via a plurality of communication links, said plurality of frames of data being stored in queues, each of the queues having a queue control block associated with each of the communication links, the plurality of queue control blocks being placed in each public QCB list corresponding to the particular communication link, wherein each queue control block contains at least a pointer to the queue and a pointer to the next data position for transmission, and wherein each of the communication links has an associated current-queue-pointer, said computer system comprising:

a) means setting a current-queue-pointer to point to a queue control block in the public QCB list corresponding to a particular communication link, the queue being pointed to by said queue control block containing a frame of data;

b) means testing whether or not the particular communication link is available for transmission of data, if the communication link is available for transmission of data, and (i) if the queue being pointed to by the current-queue-pointer is empty and if a background QCB list for the particular communication link is not empty,
the current-queue-pointer is set to point to a queue control block from the background QCB list, and
said queue control block now pointed to by the current-queue-pointer is removed from the background QCB list, (ii) if the queue being pointed to by the current-queue-pointer is empty and if the public QCB list is not empty,
the current-queue-pointer is set to point to a queue control block from the public QCB list, and
said queue control block now pointed to by the current-queue-pointer is removed from the public QCB list, and (iii) if the queue being pointed to by the current-queue-pointer is not empty, a data packet is extracted from the queue being pointed to by the queue control block being pointed to by the current-queue-pointer and said data packet is transmitted to the remote computer connected via the particular communication link;

c) means testing whether or not the user has requested a specific frame of data, if the user has requested a particular frame of data, (i) the queue control block being pointed to by said current-queue-pointer is placed at a first location within a particular QCB list, and (ii) the current-queue-pointer is set to point to the queue control block pointing to the queue storing said specific frame of data;

d) means testing whether or not the user has created a new frame of data, if the user has created a new frame of data, (i) the new frame of data is placed into a queue, and a queue-control-block is established associating with each of said plurality of communication links for the queue for the new frame of data, (ii) the queue control block being pointed to by said current-queue-pointer is placed at a first location within a particular list of QCBs, and (iii) the current-queue-pointer is set to the queue control block pointing to the queue storing the new frame of data.

20. A computer system as recited in claim 19 wherein said first location is the background QCBs list.

21. A computer system as recited in claim 19 wherein said host computer provides a transfer queue, that provides a storage space for use in transferring said frames of data between the plurality of remote computers via the plurality of communication links and includes a transfer queue control block, and wherein in the operation of said means testing whether or not the particular communication link is available, it further determines if the queue being pointed to by the current-queue pointer is empty, and if the transfer queue is not empty, a data packet is extracted from the transfer queue and said data packet is transmitted to the remote computer connected via the particular communication link.

22. A computer system as recited in claim 21 wherein a private message may be transmitted by said host computer to a remote computer by placing the private message in a private message queue in said host computer, and wherein in each of said plurality of remote computers the private message queue has a private message queue control block, said logic means further including means for determining if the queue being pointed to by the current-queue pointer is empty, and if the private message queue is not empty, setting the current-queue pointer to the private message queue control block.

23. A computer system as recited in claim 22 wherein the host computer receives a packet of data from a remote computer, and further includes means for determining (a) if the received packet is designated for the host computer, and
   if the received packet is a private message for the host computer,
      displaying the private message on a screen for the host computer,
   if the received packet is not a private message for the host computer,
      copying the received packet to a storage location whereby the received packet of data can be accessed and manipulated by the host computer, and
      placing the received packet in the transfer queue; and
(b) if the received packet is not designated for the host computer, placing the received packet in the transfer queue.

24. A computer system as recited in claim 23 wherein each communication link is managed by a channel manager that manages and directs data in the queues through the use of the queue control blocks, the queue control blocks being updated after extraction of data packets.

25. A computer system as recited in claim 19 wherein a private message may be transmitted by said host computer to a remote computer by placing the private message in a private message queue, the private message queue having a private message queue block, said logic means further including a means for determining if the queue being pointed to by the current-queue pointer is empty, and if the private message queue is not empty, setting the current-queue pointer to the private message queue control block.

26. A computer system as recited in claim 19 wherein each communication link is managed by a channel manager that manages and directs data in the queues through the use of the queue control blocks, the queue control blocks being updated after extraction of data packets.

27. A computer system as recited in claim 19 wherein the host computer receives a packet of data from a remote computer, and further including means for determining (a) if the received packet is designated for the host computer, and
   if the received packet is a private message for the host computer,
      displaying the private message on a screen for the host computer,
   if the received packet is not a private message for the host computer,
      copying the received packet to a storage location whereby the received packet of data can be accessed and manipulated by the host computer, and
      placing the received packet in the transfer queue; and
(b) if the received packet is not designated for the host computer, placing the received packet in the transfer queue.

* * * * *